(12) United States Patent
Marich

(10) Patent No.: US 7,178,425 B2
(45) Date of Patent: Feb. 20, 2007

(54) TRANSMISSION AXLE SEAL COVER, LUBRICATION DAM AND ROCK GUARD

(75) Inventor: Randall M. Marich, Howell, MI (US)

(73) Assignee: General Motors Corporation, Detroit, MI (US)

( * ) Notice: Subject to any disclaimer, the term of this patent is extended or adjusted under 35 U.S.C. 154(b) by 279 days.

(21) Appl. No.: 10/765,240

(22) Filed: Jan. 26, 2004

(65) Prior Publication Data
US 2004/0182198 A1   Sep. 23, 2004

Related U.S. Application Data

(60) Provisional application No. 60/455,890, filed on Mar. 18, 2003.

(51) Int. Cl.
*F16H 57/02* (2006.01)
(52) U.S. Cl. ........................................ 74/607
(58) Field of Classification Search ............ 74/606 R, 74/607, 608, 609; 403/12, 13; 277/370, 277/375, 551, 572, 577
See application file for complete search history.

(56) References Cited

U.S. PATENT DOCUMENTS

| | | | |
|---|---|---|---|
| 2,860,535 A * | 11/1958 | Fowler | 81/8.1 |
| 4,218,813 A * | 8/1980 | Cather, Jr. | 29/450 |
| 4,815,884 A | 3/1989 | Halliday, Jr. et al. | 403/13 |
| 5,052,695 A * | 10/1991 | Curtis | 29/235 |
| 5,505,525 A * | 4/1996 | Denton | 301/108.4 |
| 6,244,600 B1 * | 6/2001 | Leturcq | 277/353 |
| 6,370,751 B1 * | 4/2002 | Rullmann et al. | 29/235 |

FOREIGN PATENT DOCUMENTS

EP    1240980 A1    3/2002

* cited by examiner

*Primary Examiner*—Vicky A. Johnson
(74) *Attorney, Agent, or Firm*—Dan L. Thompson

(57) ABSTRACT

A cover for an aperture defined by an axle seal on a transmission includes a guard plate and a shield coupled to the axle seal. The shield includes a first portion and a detachable second portion. The shield encloses an aperture in the guard plate when the second portion is attached to the first portion. The shield includes an aperture aligned with the guard aperture when the second portion is detached from the first portion.

15 Claims, 5 Drawing Sheets

TRANSMISSION AXLE SEAL COVER, LUBRICATION DAM AND ROCK GUARD

CROSS-REFERENCE TO RELATED APPLICATION

This application claims the benefit of U.S. Provisional Application No. 60/455,890 filed on Mar. 18, 2003. The disclosure of the above application is incorporated herein by reference.

BACKGROUND OF THE INVENTION

The present invention relates generally to automatic transmissions and, more particularly, to a low cost transmission axle seal cover, lubrication dam and rock guard.

Automatic transmissions for vehicles must be filled with fluid to operate properly. In a production environment, the transmission may be filled prior to shipping to the vehicle assembly plant or after the transmission has been received at the vehicle assembly plant. Shipping the vehicle transmission filled with fluid is possibly the most efficient means. This method eliminates operator error such as over-filled and under-filled conditions. Shipping with the fluid also eliminates the necessity for a dipstick.

Conventional transmissions for front wheel drive vehicles include at least one aperture for receipt of a stub shaft. This aperture is conventionally sealed through the use of a stainless steel cup pressed on to the journal of the shaft. An axle seal sealingly engages the transmission housing and the stainless steel cup to retain the fluid within the transmission housing. While this design has functioned sufficiently in the past, it is desirable to provide an improved transmission axle seal cover, lubrication dam and rock guard.

SUMMARY OF THE INVENTION

The present invention provides a cover for an axle seal that is impervious to water and debris during shipping. The cover also prevents damage to the axle spline and seal. The cover includes a detachable portion to allow access to the axle shaft or axle seal aperture after shipping has been completed. A lubricant dam is coupled to the axle shaft seal to retain the transmission fluid within the transmission housing. A portion of the cover remains coupled to the transmission housing to function as a rock guard for the seal. A drain port is provided to allow debris and water to exit the transmission housing. Use of the cover of the present invention reduces seal damage due to the presence of petroleum jelly as a lubricant on the lips of the seal. Furthermore, each of the above features may be provided in a cover having reduced cost from that previously known.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
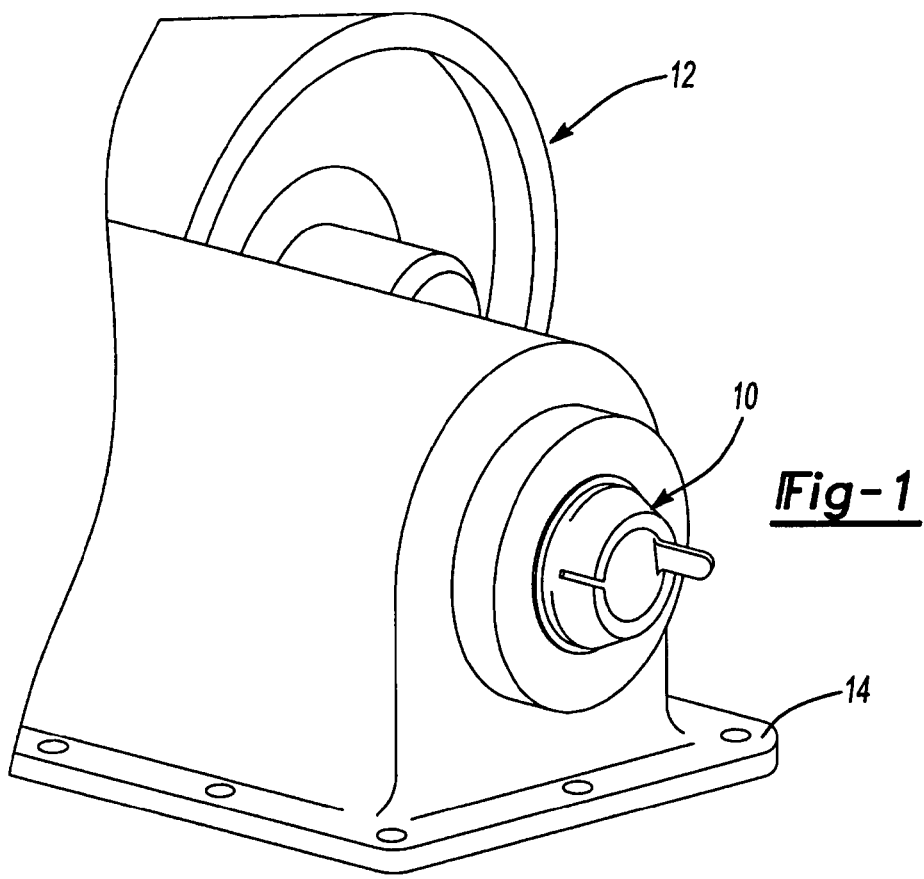
FIG. 1 is a perspective view of an exemplary transmission equipped with a cover constructed in accordance with the teachings of the present invention.
Figure 2:
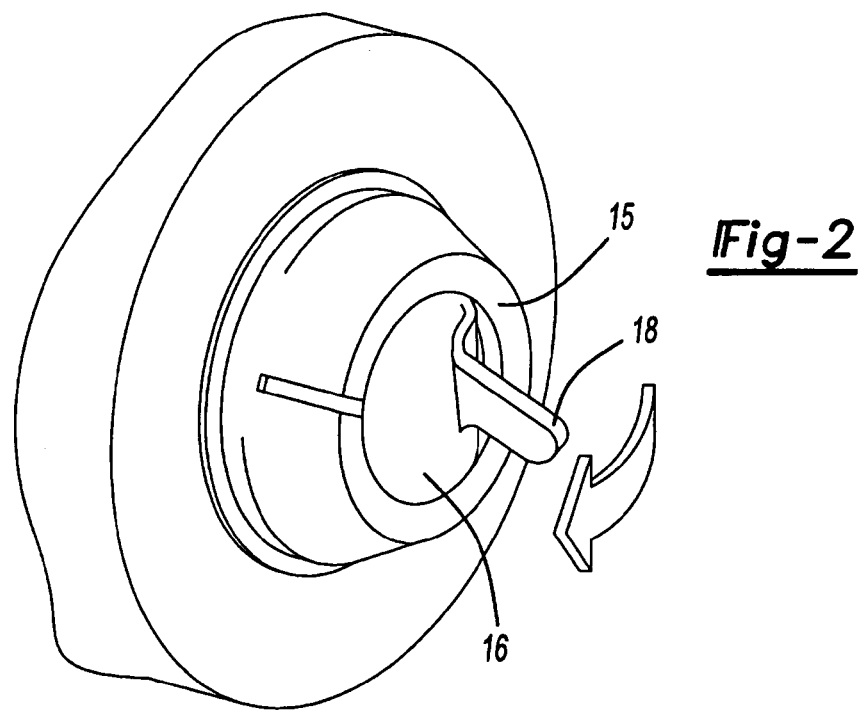
FIG. 2 is a partial perspective view of the cover of FIG. 1 depicting a detachable portion being removed.

FIGS. 1 and 2 depict a transmission axle seal cover 10 coupled to an exemplary automatic transmission 12. Automatic transmission 12 is shown as a transverse mounted unit for use in a front wheel drive vehicle. However, it should be appreciated that the cover of the present invention may be used with any number of transmissions in which it is desirable to ship the transmission filled with fluid. In FIG. 1, cover 10 is shown coupled to a housing 14 of transmission 12 in an "as-shipped" condition. In the as-shipped condition, the axle apertures of transmission 12 are sealed with the transmission axle seal cover and lubrication dam of the present invention. Accordingly, transmission housing 14 may be filled with lubricant at the transmission assembly plant thereby eliminating the need for transmission fluid handling at the vehicle assembly plant.

FIG. 2 depicts cover 10 as including a first portion 15 and a detachable second portion 16. Detachable second portion 16 has a tang 18 extending therefrom. Detachable second portion 16 is removed only after the majority of shipping and handling has been completed. Once a vehicle assembler is ready to couple a drive line component such as a tripot or an axle shaft to transmission 12, detachable second portion 16 is removed. Detachable second portion 16 is removed by grasping tang 18 and pulling. As will be described in greater detail hereinafter, lubrication does not immediately exit transmission assembly 12 due to the presence of a lubrication dam.

Figure 3:
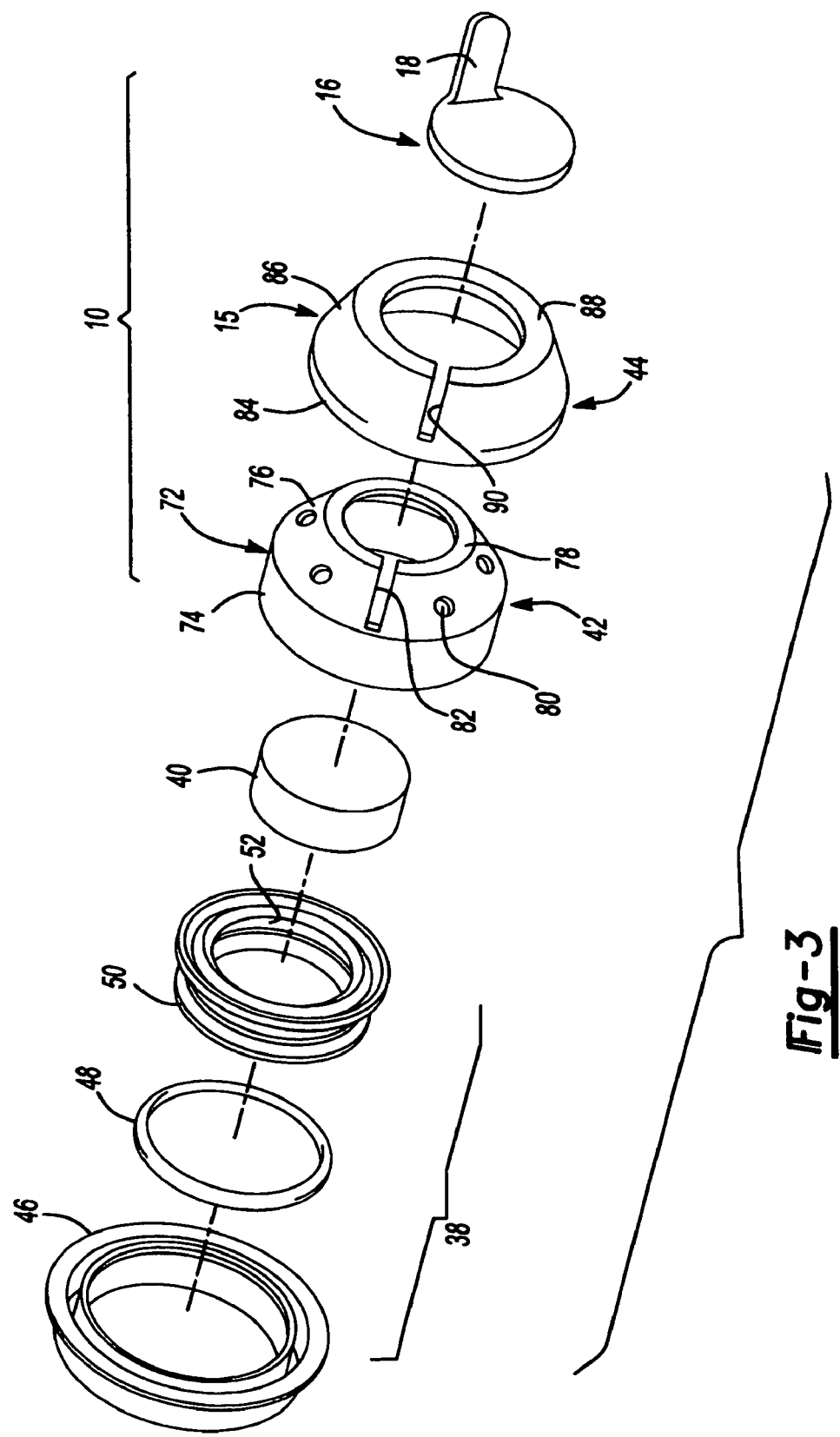
FIG. 3 is an exploded perspective view of the cover of the present invention.
Figure 4:
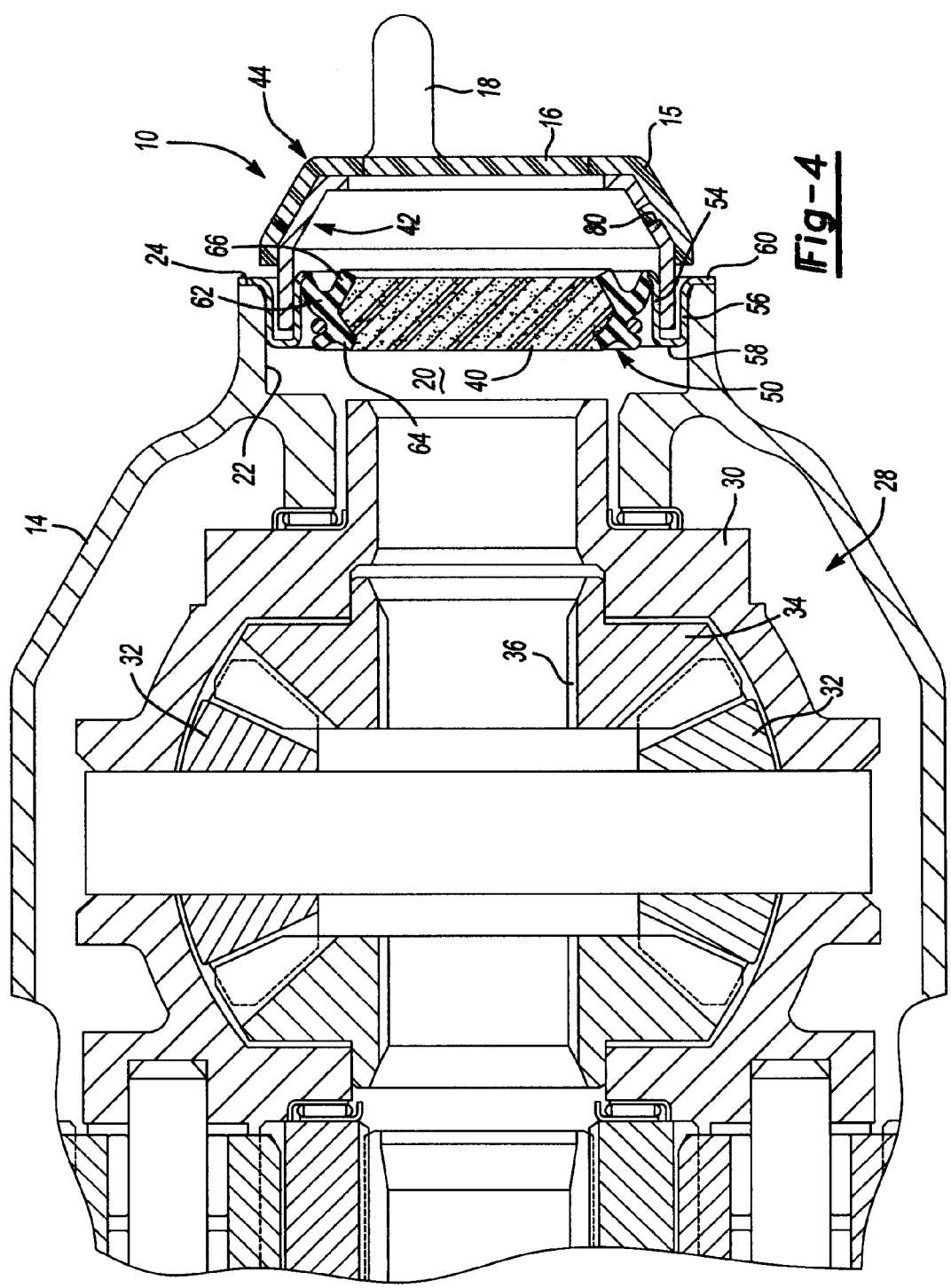
FIG. 4 is a partial cross-sectional view of a transmission assembly including the cover of the present invention.
Figure 5:
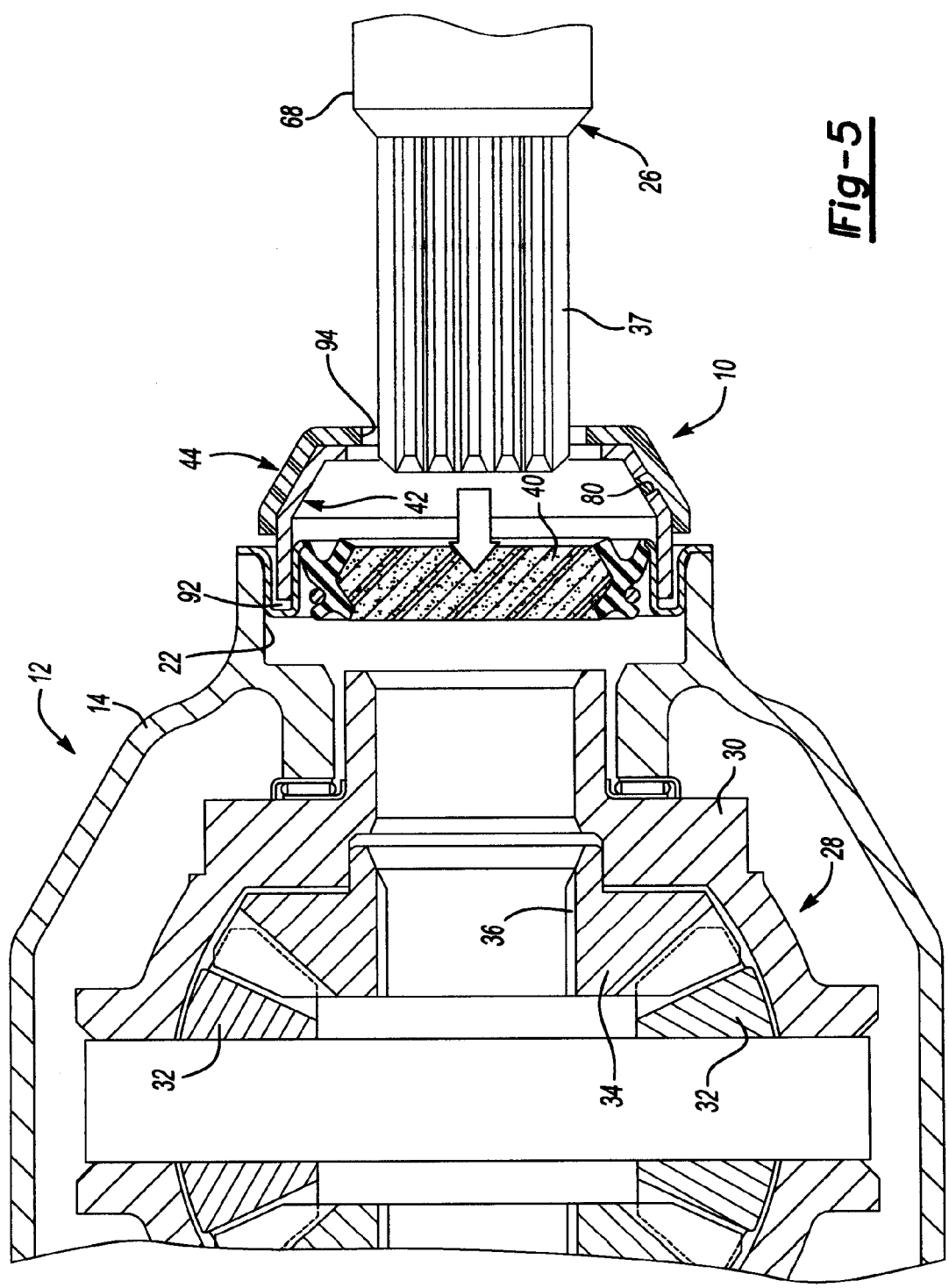
FIG. 5 is a partial cross-sectional view of the transmission assembly of FIG. 4 including a portion of a shaft to be coupled thereto.

With reference to FIGS. 3–5, transmission housing 14 includes an axle aperture 20 having an inner circumferential wall 22 and an end face 24. Axle aperture 20 provides access for interconnecting a driven shaft 26 to a differential assembly 28. Differential assembly 28 includes a case 30, a pair of pinion gears 32, and a pair of side gears 34. Case 30 is rotatably coupled to housing 14. One of side gears 34 includes an internal spline 36 for driving engagement with an external spline 37 of driven shaft 26. To assure proper transmission function, housing 14 is at least partially filled with lubricant. For obvious reasons, it is desirable to retain the lubricant in the interior of the housing. The axle seal cover and lubrication dam of the present invention function as a sealing system to retain the lubricant within the housing during shipping, assembly and final product operation.

The sealing system includes a seal assembly 38, a lubrication dam 40, and a cover 10. Cover 10 includes a guard 42 and a shield 44. Seal assembly 38 is coupled to transmission housing 14.

Seal assembly 38 includes a case 46, a spring 48 and an elastomer 50. Elastomer 50 is integrally bonded to case 46. Elastomer 50 is preferably constructed from a material under the tradename Vamac. Elastomer 50 defines an aperture 52. Case 46 includes an inner circumferential wall 54 and an outer circumferential 56 interconnected by a radially extending end wall 58. A radially extending flange 60 extends from outer circumferential wall 56.

Elastomer 50 includes a body 62 coupled to inner circumferential wall 54 of case 46. Elastomer 50 also includes a first lip 64 and a second lip 66 for sealing engagement with a cylindrical portion 68 of a driven or tripot shaft 26. Seal assembly 38 is pressed into axle aperture 20 such that outer circumferential wall 56 biasedly engages inner circumferential wall 22 of housing 14. Seal assembly 38 is inserted until radially extending flange 60 of case 46 engages end face 24 of housing 14.

Guard 42 includes a body 72 having a cylindrical portion 74 and a conical portion 76. A flange 78 is formed at the end of conical portion 76. A plurality of apertures 80 extend through conical portion 76. A drainage slot 82 axially extends through conical portion 74 to allow trapped contaminants such as water and dirt an opportunity to escape during operation. It should be appreciated to one skilled in the art that while guard 42 is shown constructed from steel sheet, any number of other structurally robust materials such as aluminum, brass or sheet molded compound may be used.

Shield 44, including first portion 15 and second detachable portion 16, is molded to guard 42. Shield 44 includes a substantially cylindrical portion 84 and a conical portion 86. A radially inwardly extending flange 88 is positioned at the end of conical portion 86. A drainage slot 90 axially extends through conical portion 86. Slot 90 is aligned with slot 82 of guard 42.

After seal assembly 38 has been mounted to transmission housing 14, dam 40 is formed by dispensing petroleum jelly within aperture 52 of elastomer 50. Preferably, the dam will axially extend from first lip 64 to second lip 66. After the dam is formed, cover 10, including guard 42 and shield 44 is coupled to seal assembly 38. Specifically, cover 10 is axially translated to cause cylindrical portion 74 to enter a recess 92 formed between inner circumferential wall 54 and outer circumferential wall 56 of case 46. Cylindrical portion 74 of guard 42 is sized to biasedly engage case 46 thereby coupling cover 10 to seal assembly 38. At this time, transmission 12 may be filled with lubricant and shipped to the vehicle assembly plant.

If the transmission is not to be installed in a vehicle within approximately 30 days of fluid filling, the transmission is oriented to minimize fluid contact with lubrication dam 40. This transmission positioning is beneficial because the fluid may otherwise permeate the dam if the fluid is in contact with the dam for an extended period of time such as two to three years.

When access to axle aperture 20 is desired, detachable second portion 16 is removed from first portion 15 by pulling tang 18. Detachable second portion 16 is discarded. As shown in FIG. 5, a driven shaft such as shaft 26 is inserted within an aperture 94 within shield 44 formed by the removal of detachable second portion 16. To complete the assembly process, shaft 26 is axially inserted within housing 14 to pierce lubrication dam 40 and engage external spline 37 with internal spline 36. Once shaft 26 is properly positioned, cylindrical portion 68 of shaft 26 engages first lip 64 and second lip 66 of seal assembly 38 to assure that lubricant contained within housing 14 does not escape through axle aperture 20.

Figure 6:
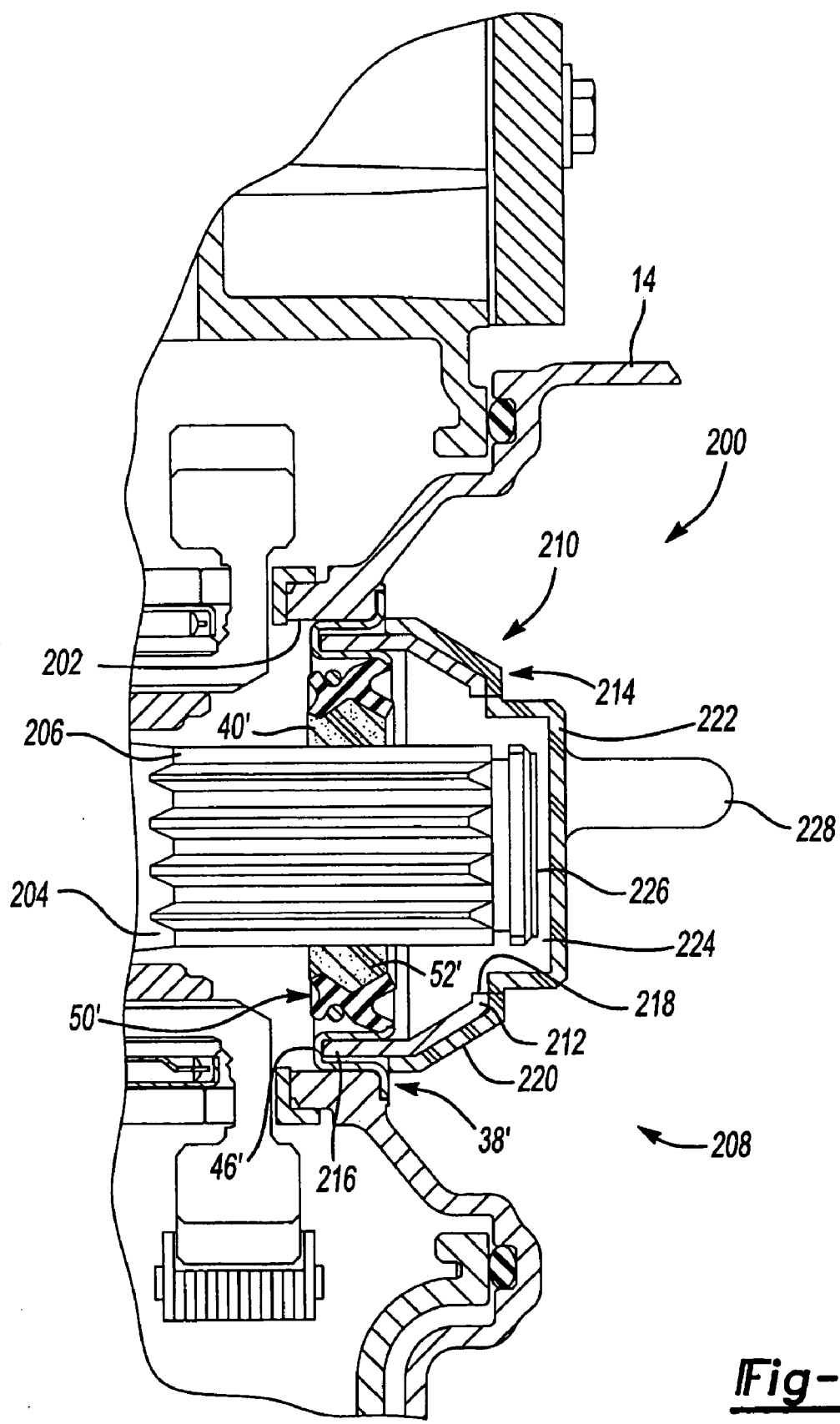
FIG. 6 is a cross-sectional view of a transmission equipped with an integral shaft shielded by an alternate embodiment cover constructed in accordance with the teachings of the present invention.

With reference to FIG. 6, an alternate embodiment cover is depicted at reference number 200. Cover 200 cooperates with a second axle aperture 202 formed in transmission housing 14. Second axle aperture 202 is located at the opposite end of transmission housing 14 from axle aperture 20. In the embodiment shown, a stub shaft 204 extends through second axle aperture 202. Stub shaft 204 includes a male spline 206 for engagement with a driven shaft (not shown) such as a tripot or another driving member. One skilled in the art will appreciate that second axle aperture 202 is enclosed by a sealing system 208 substantially similar to the sealing system previously described. As such, similar components will be identified with like numerals having a prime designation. Specifically, seal assembly 38' engages housing 14 at aperture 202. Seal assembly 38' includes an elastomer 50' which defines an aperture 52'. Aperture 52' is partially but not completely filled by stub shaft 204. The annular space between elastomer 50' and stub shaft 204 is filled with a petroleum jelly forming lubrication dam 40'.

Because stub shaft 204 extends outwardly from housing 14, an alternate cover 210 is provided. Cover 210 includes a guard 212 and a shield 214. Shield 214 is integrally molded to guard 212. Guard 212 includes a cylindrical portion 216 engaged with case 46' of seal assembly 38'. Guard 212 includes an aperture 218 through which stub shaft 204 extends.

Shield 214 includes a first portion 220 and a detachable second portion 222. Detachable second portion 222 includes a recess 224 for housing an end 226 of stub shaft 204. Detachable second portion 222 includes a tang 228 to assist an operator in removing detachable second portion 222 from cover 210. As previously mentioned, the majority of shipping and handling, including filling the transmission with fluid, will occur with detachable second portion 222 coupled to cover 210.

Detachable second portion 222 is removed once an operator wishes to couple a driven shaft, such as a tripot, to external spline 206. Lubrication will not exit transmission housing 214 due to the presence of lubrication dam 40'. To complete the assembly process, the driven shaft is inserted within second axle aperture 202 to engage external spline 206. During this operation, lubrication dam 40' is pierced and the driven shaft engages elastomer 50' to maintain a seal at second axle aperture 202. One skilled in the art will appreciate that the presence of petroleum jelly on elastomer 50' provides desirable lubrication and may minimize seal tearing or rupture during the assembly and use of transmission assembly 12.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

The invention claimed is:

1. A cover for an axle seal aperture, the axle seal being coupled to a transmission housing, the cover comprising:
 a guard plate having an aperture extending therethrough, said guard plate being adapted to engage the axle seal and couple said guard plate thereto;
 a shield having a first portion and a detachable second portion, said first portion being coupled to said guard plate, said shield enclosing said guard aperture when said second portion is attached to said first portion, said first portion defining an aperture aligned with said guard aperture when said second portion is detached from said first portion, wherein said guard plate includes an aperture at least partially filled by a portion of said shield.

2. The cover of claim 1 wherein said guard plate includes an annular lip adapted to be engageable with the axle seal to couple the cover to the axle seal.

3. The cover of claim 2 wherein said guard plate includes a conically shaped section positioned adjacent said annular lip, said conically shaped section adapted to cover a portion of the axle seal.

4. The cover of claim 3 wherein said guard plate includes an annular flange positioned adjacent said conically shaped section, said guard plate aperture extending through said annular flange.

5. The cover of claim 1 wherein said shield is constructed from injection moldable material.

6. The cover of claim 5 wherein said first portion includes an outwardly extending tang selectively engageable by an operator to separate said first portion from said second portion.

7. A cover for an axle seal aperture, the axle seal being coupled to a transmission housing, the cover comprising:
   a guard plate having an aperture extending therethrough, said guard plate being adapted to engage the axle seal and couple said guard plate thereto;
   a shield having a first portion and a detachable second portion, said first portion being coupled to said guard plate, said shield enclosing said guard aperture when said second portion is attached to said first portion, said first portion defining an aperture aligned with said guard aperture when said second portion is detached from said first portion wherein said guard plate includes a plurality of apertures having portions of said shield positioned in said apertures.

8. A cover for an axle seal aperture, the axle seal being coupled to a transmission housing, the cover comprising:
   a tubular guard structure having a substantially cylindrical wall portion positioned adjacent to a substantially conical wall portion, said cylindrical wall portion being adapted to engage the axle seal and couple the cover to the axle seal; and
   a shield having a first portion and a detachable second portion, said first portion being coupled to said guard structure and at least partially extending into an aperture formed in said guard structure, said shield enclosing one end of said guard structure when said second portion is attached to said first portion, said first portion defining an aperture in communication with a passage defined by said tubular guard structure when said second portion is detached from said first portion.

9. The cover of claim 8 wherein said guard structure includes a radially inwardly extending annular flange positioned adjacent to said conical wall portion.

10. The cover of claim 9 wherein said annular flange defines a guard aperture aligned with said first portion aperture.

11. The cover of claim 8 wherein said shield is constructed from an injection moldable material.

12. The cover of claim 11 wherein said first portion includes an outwardly extending tang selectively engageable by an operator to separate said first portion from said second portion.

13. The cover of claim 8 wherein said second portion includes a cylindrically shaped hollow wall.

14. The cover of claim 13 wherein said cylindrically shaped hollow wall includes a longitudinal axis aligned with a longitudinal axis of said tubular guard structure.

15. A cover for an axle seal aperture, the axle seal being coupled to a transmission housing, the cover comprising:
   a tubular guard structure having a substantially cylindrical wall portion positioned adjacent to a substantially conical wall portion, said cylindrical wall portion being adapted to engage the axle seal and couple the cover to the axle seal; and
   a shield having a first portion and a detachable second portion, said first portion being coupled to said guard structure, said shield enclosing one end of said guard structure when said second portion is attached to said first portion, said first portion defining an aperture in communication with a passage defined by said tubular guard structure when said second portion is detached from said first portion wherein said guard structure includes a plurality of apertures having portions of said shield positioned in said apertures.

* * * * *